US006968856B1

(12) United States Patent
Goza

(10) Patent No.: US 6,968,856 B1
(45) Date of Patent: Nov. 29, 2005

(54) MECHANICALLY AUTOMATED FLUID CONSUMPTION LIMITING APPARATUS

(76) Inventor: Michael Goza, 2400 Spring Rain Dr. #933, Houston, TX (US) 77379

( * ) Notice: Subject to any disclaimer, the term of this patent is extended or adjusted under 35 U.S.C. 154(b) by 0 days.

(21) Appl. No.: 10/886,357

(22) Filed: Jul. 7, 2004

(51) Int. Cl.[7] .......................... F16K 31/12; F16K 21/16
(52) U.S. Cl. ................... 137/488; 137/599.13; 251/15; 251/24; 239/68; 222/59
(58) Field of Search .......................... 137/488, 599.11, 137/599.13; 251/15–24; 222/14, 59; 239/68

(56) References Cited

U.S. PATENT DOCUMENTS

| 579,464 | A | | 3/1897 | Bentley | |
|---|---|---|---|---|---|
| 760,595 | A | * | 5/1904 | Wisebrock | 137/488 |
| 1,812,586 | A | | 6/1931 | Elder | |
| 1,956,145 | A | | 4/1934 | Burkhart | |
| 2,545,928 | A | | 3/1951 | Martin | |
| 2,642,076 | A | | 6/1953 | Tigert | |
| 3,169,666 | A | * | 2/1965 | Rinkewich | 222/20 |
| 3,810,562 | A | * | 5/1974 | Clarke | 222/20 |
| 4,280,530 | A | | 7/1981 | Yi | |
| 4,633,905 | A | * | 1/1987 | Wang | 137/624.11 |
| 6,397,687 | B1 | | 6/2002 | Garmas | |

* cited by examiner

Primary Examiner—Ramesh Krishnamurthy
(74) Attorney, Agent, or Firm—Keeling Hudson L.L.C.; Kenneth A. Keeling

(57) ABSTRACT

A mechanical automatic fluid consumption limiting apparatus for limiting flow through a primary flow line includes an actuating line, a control line, a rotary meter, a control assembly, an actuating valve, a diaphragm valve on the primary line, an eductor and an engagement controller. The actuating valve, initially spring-biased to a non-actuating position, is rotated to an actuating position effecting closure of the diaphragm valve responsive to a predetermined quantity of flow through the rotary meter and mechanical response of the control assembly. An eductor diaphragm is positioned within the eductor responsive to flow through the primary line and pressure from the actuating line. The engagement controller is connected to the eductor diaphragm. The control line by-passes the diaphragm valve to provide pressure within the eductor to re-position the eductor diaphragm after closure of the diaphragm valve. Such re-positioning causes linear displacement of the engagement controller to disconnect the control assembly connection of the rotary meter and the actuating valve, allowing the actuating valve to reset to an initial position, thereby relieving pressure in the diaphragm valve and allowing the diaphragm valve to reopen and allowing resumption of flow through the primary line.

21 Claims, 8 Drawing Sheets

MECHANICALLY AUTOMATED FLUID CONSUMPTION LIMITING APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to devices that automatically limit fluid flow. Specifically, the present invention relates to devices that mechanically shut off uncontrolled primary fluid flow after a predetermined volume of continuous fluid flow is detected, limit consumption thereafter, and automatically resets the device to an initial position once fluid flow has terminated.

2. Description of the Related Art

With water consumption becoming limited in many areas, it is increasingly important to detect and prevent over consumption or uncontrolled water usage. There are some flow control devices designed to stop fluid flow that has continued for a predetermined amount of time.

Devices stopping fluid flow after a predetermined amount of time include U.S. Pat. No. 4,280,530 to Kon H. Yi, issued on Jul. 28, 1981. This patent discloses a water-flow-control device that mechanically controls the flow of a specific amount of water in a predetermined period of time. The 530' device is primarily designed for agricultural and garden purposes, for example, precisely controlling the amount of water delivered to a garden in a set period of time. A required feature of each claim of the 530' patent is a timing means for controlling the periods in which a specified amount of water is permitted to pass through the device.

U.S. Pat. No. 2,545,928 to Martin, issued on Mar. 20, 1951 relates to an automatic water shutoff device in which a conventional mechanical alarm clock is employed to stop water flow after a preset amount of time.

While having fluid consumption limited by time is helpful in certain situations, such as lawn care, a single predetermined length of time for all fluid usages is impractical. For example, the amount of time that one desires a garden to be watered may be different than the amount of time needed to run a dishwasher. Thus, it would be an improvement to the art to have a device that stops uncontrolled fluid flow based on actual usage rather than time.

Other prior art devices stop fluid flow after a predetermined volume of fluid has passed through the device.

U.S. Pat. No. 579,464 to Bentley on Mar. 23, 1897 presents an automatic cut-off device for preventing damaging overflows of water typically resulting from leaving open faucets. The 464' patent is mechanical in operation, and presents a valve which closes and opens based on the passage of a predetermined quantity of fluid through a passageway and wherein the automatic mechanism effecting valve positioning is actuated by fluid pressure. Additionally, the 464' patent provides for claims on a gauge device operated by flow of fluid through the pipe and wherein the automatic mechanism is controlled by the gage device. Further, the patent discloses retracting means which readjust the pressure-operated means to original positions following cessation of flow.

U.S. Pat. No. 6,397,687 issued to Garmes on Jun. 4, 2002 discloses a water monitoring and regulation apparatus including two impellers fixed to the interior of a pipe through which water flows. Each impeller is connected to a meter. As water flows through the pipe, the impellers each turn gears located on opposing sides of a main engagement gear. The main engagement gear causes a timer gear to rotate. After a preset number of revolutions of the timer gear are reached, the timer mechanism causes a cable to retract. The cable, attached to a squared bar, pulls the bar when it is retracted. This causes the bar to slide out of a notch in a shaft to which a valve is attached. Without the bar to prevent rotation of the shaft a spring biased toward rotation of the shaft causes the valve to close. One meter may measure water usage between resets of the system while the other meter may measure continuous elapsed flow.

While both '464 and '687 patents are able to be reset after the valve has shut off the fluid supply, it would be an improvement to the art to have a control line that permits nominal fluid flow to the device outlet after the valve has shut off and that further permits the automatic reset of the flow control device after the point of uncontrolled flow, such as an open faucet or a leak, has been closed.

BRIEF SUMMARY OF THE INVENTION

Accordingly, objects of the present invention are to provide a mechanically automated fluid consumption limiting device that:

Works with fluid that is either liquid or compressed gas;

Stops fluid flow after an uncontrolled predetermined volume of fluid has passed through the device;

May have changeable components to provide different predefined volumes of uncontrolled fluid flow to an outlet before stopping the flow of fluid;

Is reset automatically when control is restored; and

Automatically resets between controlled usages.

The present invention is an automatic flow shut off apparatus that is entirely mechanical. When flow through the apparatus is initiated at a control point downstream from the apparatus, a rotary meter, such as an impeller, provides rotation to a drive axle component of a main axle. Such rotation may be provided to the drive axle through a gear box having a gear ratio wherein the drive axle is rotated some amount less than 360 degrees for a predetermined quantity of revolutions by the rotary meter. The predetermined quantity of rotary meter revolutions corresponds to the volume selected to represent an "uncontrolled" flow. Thus, uncontrolled flow is flow of more than a pre-selected volume of fluid through the flow control apparatus. Controlled flow is flow of less than the pre-selected volume of fluid through the apparatus.

A diaphragm valve, initially biased to an open position, is in fluid communication with the rotational device. Fluid exiting the diaphragm valve flows into an eductor. The flow of fluid through the eductor creates suction within a suction chamber to which the underside of a pressure diaphragm is affixed. The upper side of the diaphragm is retained by a housing to form a pressure chamber into which an amount of fluid from the device inlet is directed through a segment of an actuator line. The pressure within the chamber and the suction created by the eductor cause the diaphragm to flex into the suction chamber.

A mechanical engagement controller includes a linkage contacting the upper side of the eductor diaphragm and extending outside of the housing. Flexing of the diaphragm in the direction of the suction chamber causes linear displacement of the engagement controller. Such linear displacement by the engagement controller disengages a coupler between the drive axle and a rotary valve axle.

Rotation of the drive axle induced by the rotary meter is transferred to the rotary valve axle on which there is a rotary valve. Such rotation, upon sufficient uncontrolled through the primary line, rotates the rotary valve to a valve position where actuator line flows through the rotary valve to a diaphragm valve that cuts off flow through the primary line. The uncontrolled flow is shut off when the diaphragm valve is closed by redirected actuator line flow.

A reset spring on the rotary valve axle permits automatic resetting of the apparatus after uncontrolled flow has been stopped and a control point valve downstream of the apparatus has been closed.

A control line permits nominal fluid flow to the device outlet after an uncontrolled fluid flow is stopped. Once control is restored, such as by closing an open faucet or repairing a broken pipe downstream of the apparatus, the control line functions to automatically reset the apparatus by applying force on the underside of the eductor pressure diaphragm so that the engagement controller disengages the coupler between the drive axle and the rotary valve axle. After the rotary valve axle has been disengaged from the drive axle, the reset spring reorients the rotary valve to a reset position. If flow through the apparatus is stopped at a control point downstream of the device prior to an uncontrolled flow condition, the reset spring automatically reorients the rotary valve to a reset position.

This apparatus, installed on the main water line to a residence, limits the flow into the residence during a single usage to a predetermined volume, such as 100 gallons. Between individual usages, the apparatus automatically resets. Thus, consumption to the residence is only limited when the predetermined volume limit is achieved in a single usage.

Further, a municipality may require the installation of the apparatus on residences to aid in the restoration of water pressure after closure of the main water line. If, for example, several residences open their water taps while the main water line is closed and do not return the taps to the closed position, it may be difficult to reestablish pressure within the main water line. With a flow control apparatus in place on each residence, the primary flow into each residence having open taps will be shut off after a predetermined volume of fluid has passed through the apparatus. The control line continues to provide a nominal flow of fluid as long as the taps remain open. Once each resident closes his or her respective tap, pressure in the control line of each device will build until the apparatus resets. By stopping the primary flow into the residences, proper pressure within the main water line may be established.

This apparatus works with various types of fluids, including pressurized gases, water and oil.

Other features and advantages of the invention will be apparent from the following description, the accompanying drawing and the appended claims.

BRIEF DESCRIPTION OF THE DRAWINGS

FIGS. 1A and 1B are connected at points A, B, C, D, and E.

DESCRIPTION OF THE INVENTION

Figure 1A:
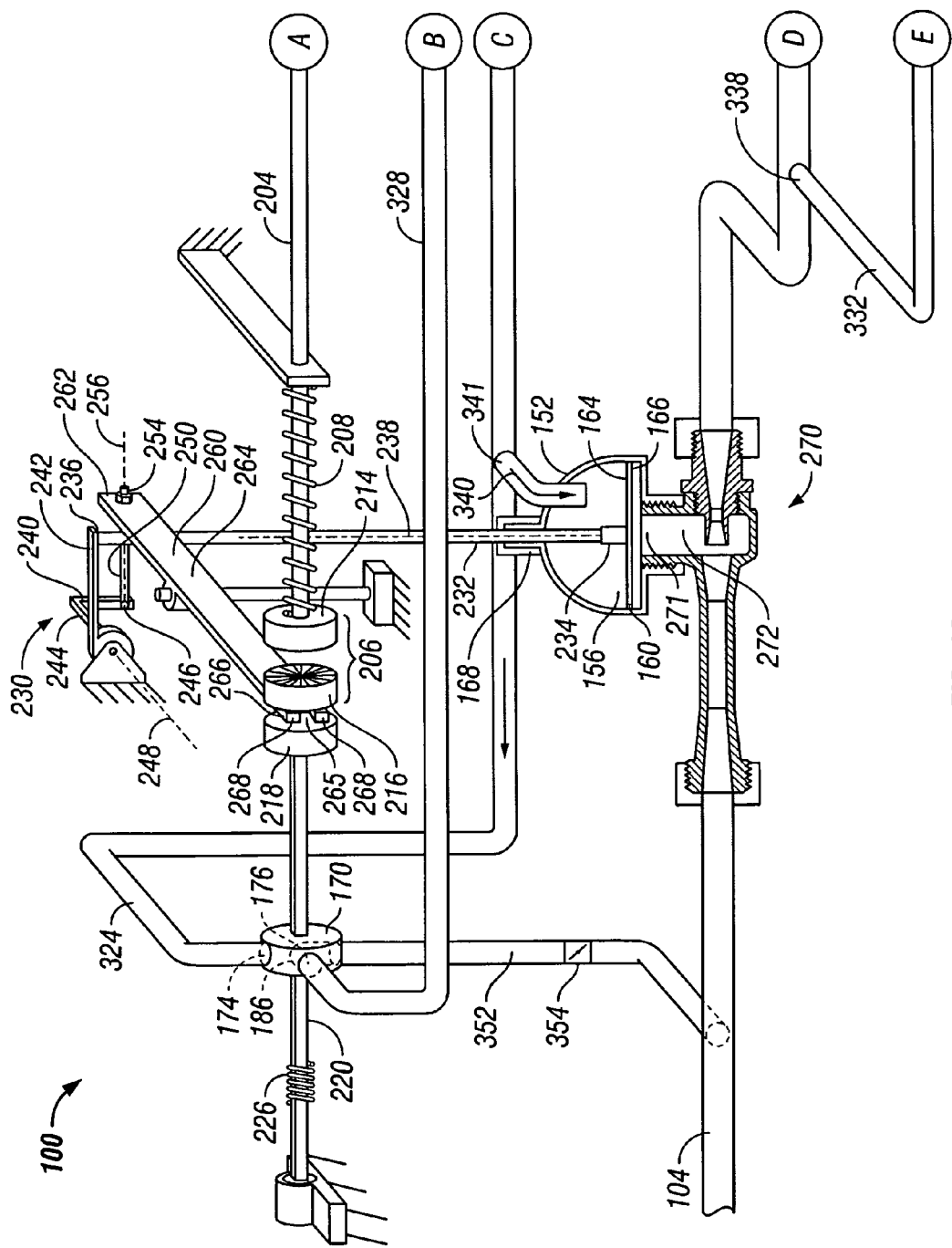
FIGS. 1A and 1B are a perspective view, including cutaways, of the preferred embodiment of the mechanically automated flow control device.
Figure 1B:
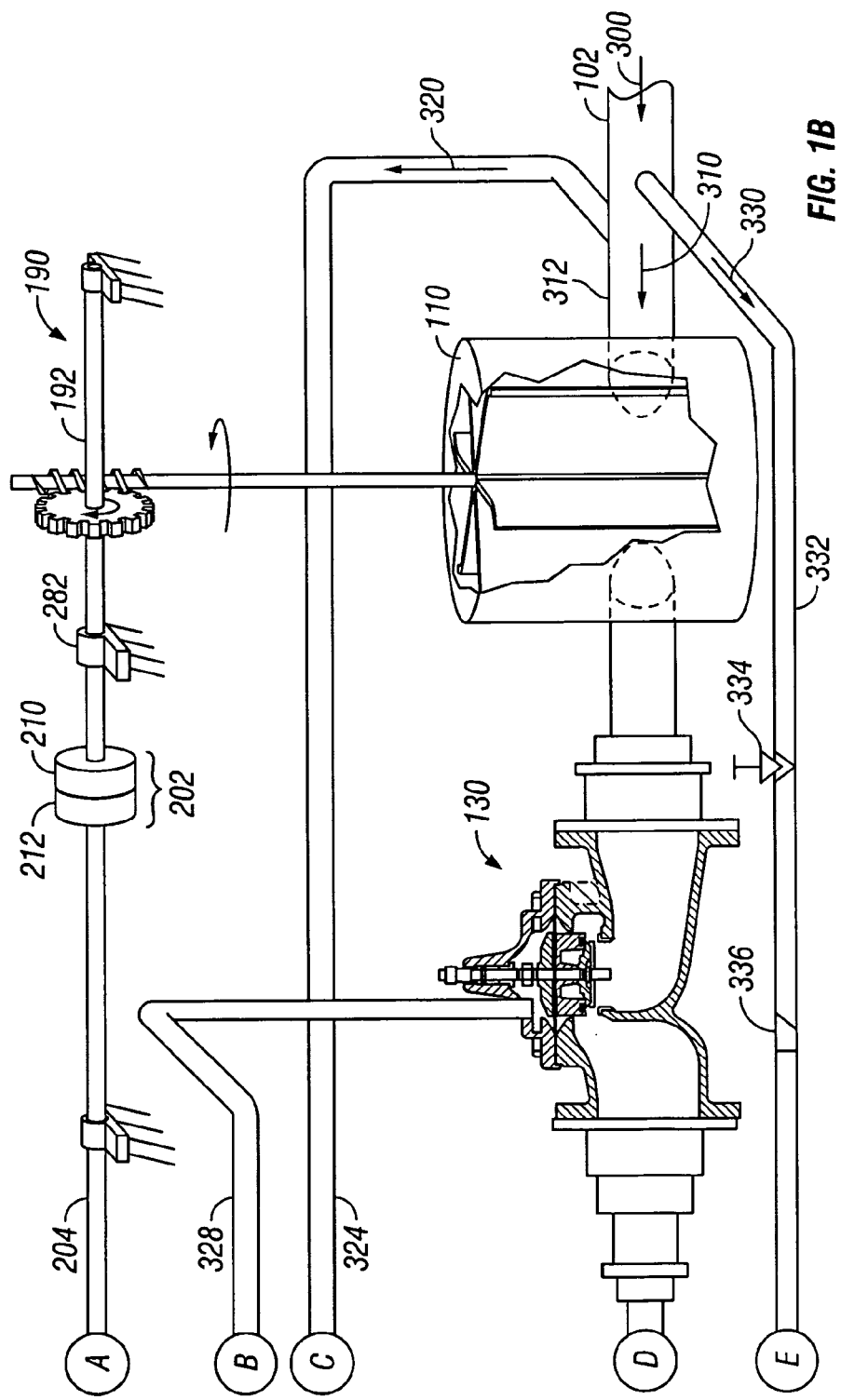

Referring to FIGS. 1A and 1B, the mechanically automated flow control apparatus of the present invention is depicted as 100 and is used to automatically shut off the flow of a fluid after a predetermined uncontrolled volume of fluid has been communicated between a device inlet 102 and a device outlet 104. A downstream valve 105 is depicted downstream of the device outlet 104. Downstream valve 105 may be considered a the control point of the device, as it is flow or stoppage of flow through that point which determines whether the device will automatically stop an uncontrolled flow or automatically reset after a controlled usage. A downstream valve 105 may be provided adjacent device outlet 104 for ready control of flow control apparatus 100 resetting.

The flow control apparatus 100 comprises a rotary meter 110, a diaphragm valve 130, a eductor diaphragm 160, an eductor 270, a rotary valve 170, a main axle control assembly 190, and an engagement controller 230. A primary line 312 provides fluid communication of a primary stream 310 by device inlet 102, rotary meter 110, diaphragm valve 130, eductor 270, and device outlet 104.

An actuating line first segment 324 provides fluid communication of an actuating stream 320 from device inlet 102 to rotary valve 170.

A pressure line 341 extending from actuating line first segment 324 provides fluid communication of a pressure stream 340 from actuating line first segment 324 to a pressure chamber 156 formed by eductor diaphragm 160 and diaphragm housing 152.

An actuating line second segment 328 provides fluid communication of actuating stream 320 from rotary valve 170 to diaphragm valve 130.

Engagement controller 230 provides a linkage between eductor diaphragm 160 and main axle control assembly 190.

A control line 332 provides fluid communication of a control stream 330 from device inlet 102 to primary line 312 at a point between diaphragm valve 130 and eductor 270.

A relief line 352 provides a connection to device outlet 104 from rotary valve 170.

Figure 2:
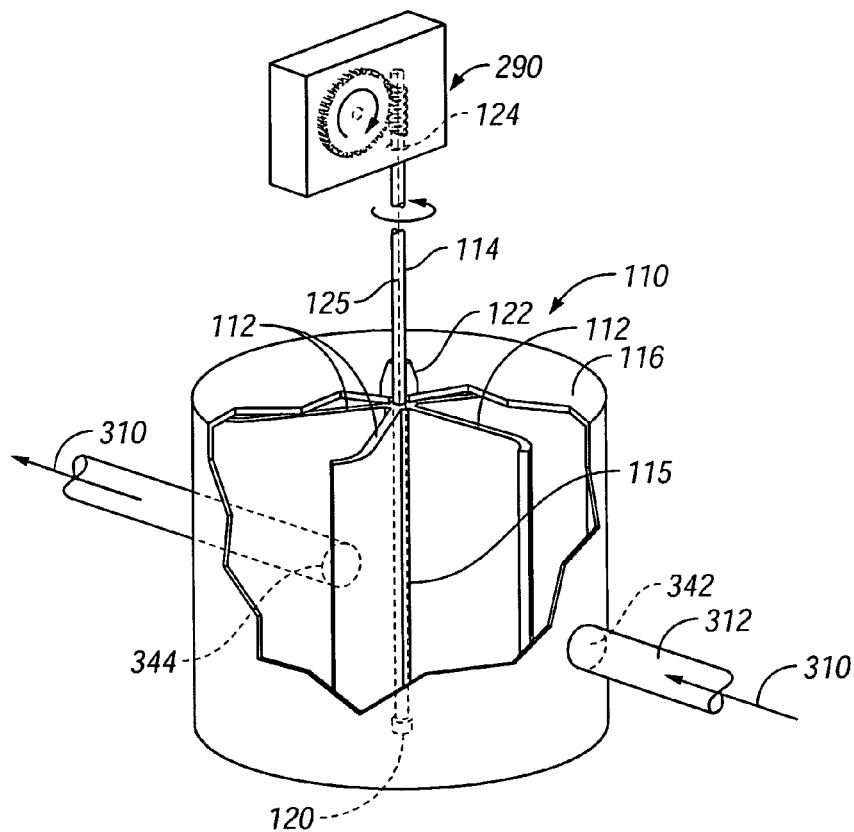
FIG. 2 is a cutaway view of the rotary meter.

Rotary meter 110 provides rotation to main axle control assembly 190 as a result of the flow of a primary stream 310 through rotary meter 110. Referring to FIG. 2, rotary meter 110 may include a plurality of impeller blades 112, an impeller shaft 114, and an impeller housing 116. Impeller blades 112 are each affixed along a first blade edge 115 proximate a first shaft end 120 of impeller shaft 114 and contained within impeller housing 116. Impeller housing 116 rotationally retains impeller shaft 114. Impeller shaft 114 extends through impeller housing 116 to a second shaft end 124, external of impeller housing 116. A shaft seal 122 prevents fluid leakage at the interface of impeller shaft 114 and impeller housing 116. Impeller shaft 114 interfaces with main axle control assembly 190 at second shaft end 124.

Continuing to refer to FIG. 2, primary line 312 is in fluid communication with a meter entry orifice 342. Primary stream 310, directed through meter entry orifice 342, enters rotary meter 110. As primary stream 310 flows through impeller housing 116, force applied to impeller blades 112 causes impeller blades 112 and impeller shaft 114 to rotate about impeller axis 125.

Figure 5:
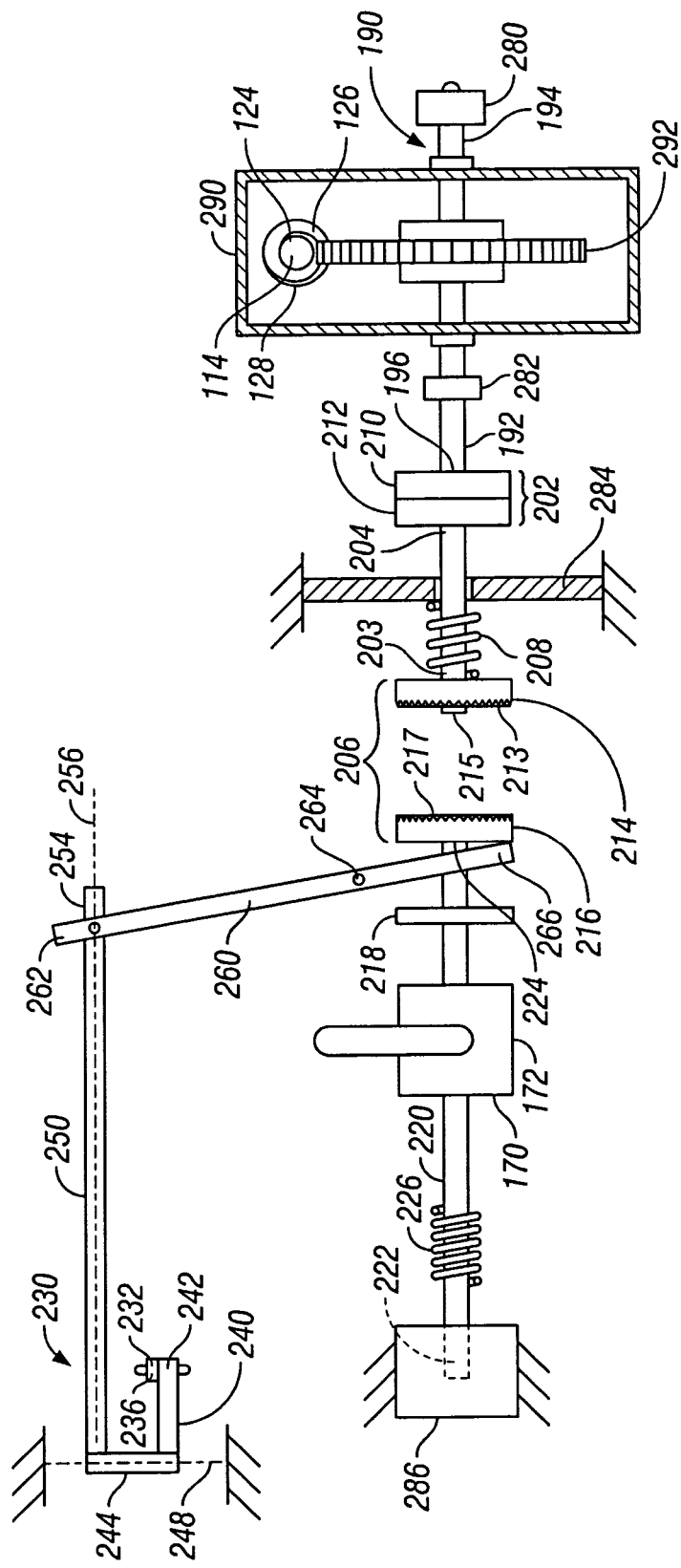
FIG. 5 is a top view of the main axle and engagement controller.
Figure 6:
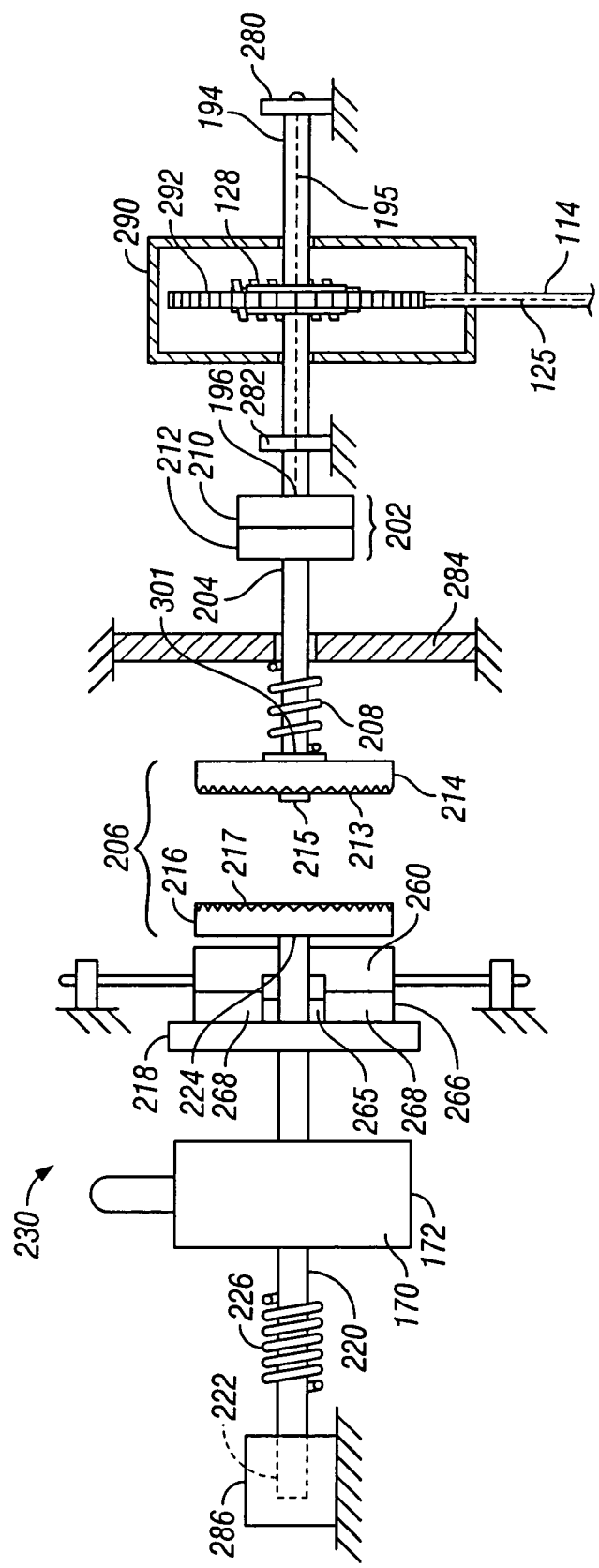
FIG. 6 is a side view of the main axle.

Referring to FIGS. 5 and 6, main axle control assembly 190 comprises a drive axle 192 and a rotary valve axle 220, which are connectable by a spring-loaded coupler 206. Drive axle 192 is retained by a first bearing 280 on a drive axle first end 194 and a second bearing 282 proximate a drive axle second end 196. Impeller shaft 114 interfaces with drive axle 192 to provide rotation thereto.

Impeller shaft 114 induces rotation to drive axle 192 through a gear assembly of appropriate size and arrangement to translate a quantity of rotations by impeller shaft 114 to a desired rotation of drive axle 192. A gear box 290 may be used to obtain the desired gear ratio at the interface of impeller shaft 114 and drive axle 192.

Figure 7:
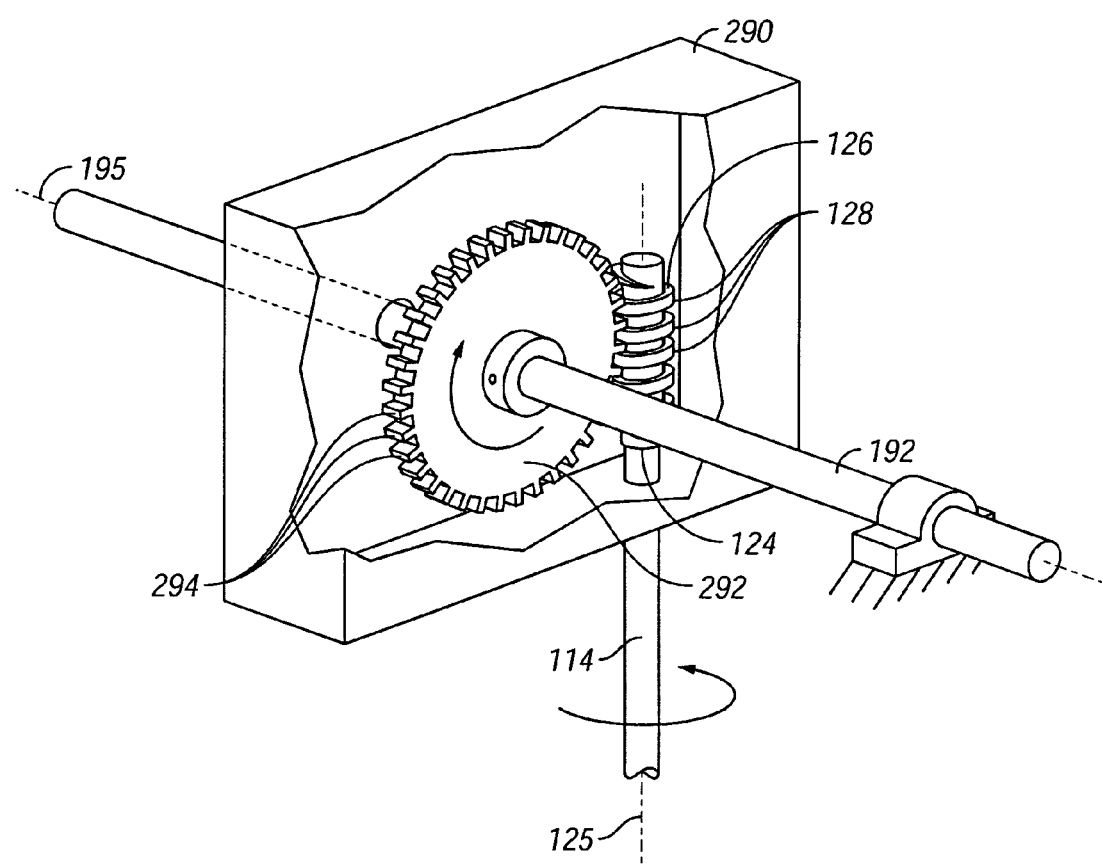
FIG. 7 is a perspective view of the gear box.

Referring to FIG. 7, rotation of impeller shaft 114 about an impeller axis 125 is transferred to rotation of drive axle 192 about a main axis 195. The gear ratio of the gears within gear box 290 permits a relatively large quantity of impeller shaft 114 revolutions to each revolution, or partial revolution, of drive axle 192. In a preferred embodiment, a worm gear 126, having a thread 128 attaches to impeller shaft 114 at second shaft end 124. A spur gear 292 is affixed to drive axle 192. Spur gear 292 includes a plurality of teeth 294 that mesh with thread 128 of worm gear 126. The gear ratio between spur gear 292 and worm gear 126 is such that spur gear 292 completes a calculated rotation sufficient to turn rotary valve 170 (not shown in FIG. 7) from a device initial position to a device final position when worm gear 126 is rotated about impeller axis 125 to a Rotation Limit.

The volume of fluid causing a single revolution of impeller shaft 114 will be called the Meter Volume. The Meter Volume is a known or calculable volume. The Volume Limit is the volume of fluid that is desired to pass through flow control apparatus 100 before stopping flow of primary stream 310. Because the Meter Volume is known and the Volume Limit is known, the quantity of impeller revolutions required before the Volume Limit is obtained may be calculated by dividing the Volume Limit by the Meter Volume. The quantity of impeller revolutions required to obtain the Volume Limit will be called the Rotation Limit.

Gear box 290 may be removable and replaceable with a separate gear box having a different set of gears corresponding to a different Rotation Limit. This allows flow control apparatus 100 to be adjustable with respect to the Volume Limit permitted to flow through the flow control apparatus 100 before the flow stopped.

Referring again to FIGS. 5 and 6, a clutch 202 and a connecting axle 204 are located between drive axle 192 and rotary valve axle 220 in the preferred embodiment. When clutch 202 and connecting axle 204 are included, clutch 202 comprises a first clutch interface 210 and a second clutch interface 212. First clutch interface 210 is located on a drive axle second end 196. Second clutch interface 212 is affixed to a connecting axle 204, which connects clutch 202 and spring-loaded coupler 206. Clutch 202 aids in the engagement of spring-loaded coupler 206 by preventing the transfer of a sudden torque from drive axle 192 to connecting axle 204, thereby also preventing sudden rotation of the components of spring-loaded coupler 206. Clutch 202 also prevents damage to the mechanical linkages of flow control apparatus 100 when an uncontrolled flow cannot be terminated, i.e. device fails.

Connecting axle 204 is rotationally retained by a third bearing 284, located intermediate second clutch interface 212 and first coupling member 214. Connecting axle 204 may be provided with splines or other keyed feature proximate connecting axle second end 203, which interfaces with first coupling member 214. The splines or keying feature transfer rotation of connecting axle 204 to first coupling member 214 while first coupling member 214 is free to slide along the splined section of connecting axle 204. A cap 215 on connecting axle second end 203 maintains first coupling member 214 on connecting axle 204.

When engaged, spring-loaded coupler 206 transfers the rotation of drive axle 192 to rotary valve axle 220. Spring-loaded coupler 206 includes first coupling member 214, an interlocking second coupling member 216, and a compression spring 208. First coupling member 214 is slidingly located on splined section of connecting axle 204 proximate a connecting axle second end 203. Second coupling member 216 is located on a rotary valve axle first end 224.

First and second coupling members 214 and 216 each include interlocking features such that rotational motion of connecting axle 204 is transferred to rotary valve axle 220. As depicted, such interlocking features may include first coupling teeth 217 that interlock with second coupling teeth 213. Such interlocking features may also include one or more prongs (not shown) extending from second coupling member 216 and corresponding receptacles (not shown) on first coupling member 214. Spring-loaded coupler 206 is engaged when first coupling teeth 217 are inserted into second coupling teeth 213.

Compression spring 208 is located intermediate third bearing 284 and first coupling member 214. As first coupling member 214 may slide within the splined section of connecting axle 204, compression spring 208 functions to bias first coupling member 214 against cap 215 at connecting axle second end 203. If the interlocking features of second coupling member 216 and first coupling member 214 are slightly misaligned, for example, second coupling member 216 may force first coupling member 214 to further compress compression spring 208. Once rotation sufficient to align the interlocking features of first and second coupling members 214 and 216 occurs, compression spring 208 forces first coupling member 214 toward second coupling member 216 to an interlocked position. Cap 215 will prevent first coupling member 214 from being dislocated from connecting axle 204 when first and second coupling members 214 and 216 are engaged.

Figure 8:
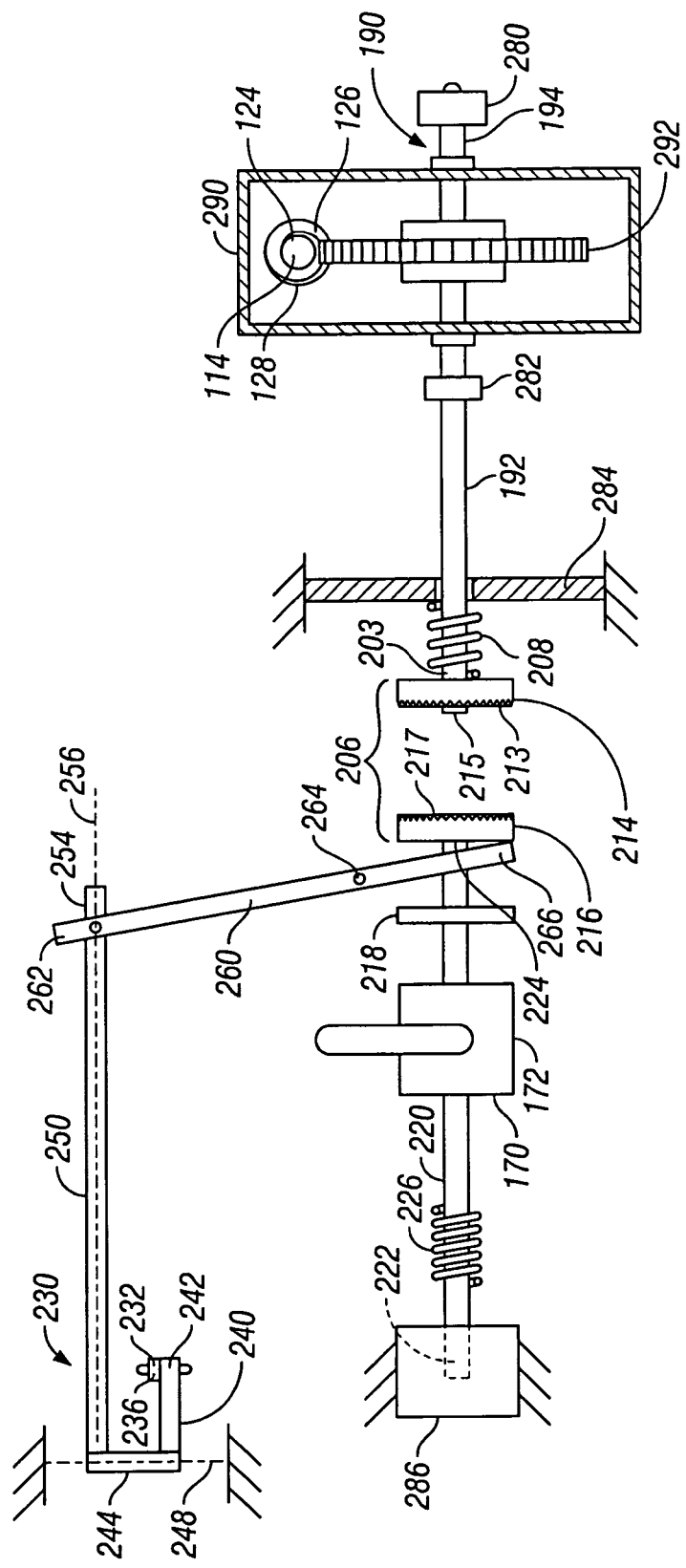
FIG. 8 is an alternative embodiment of the invention, wherein the clutch and the connecting axle are removed from the main axle control assembly.

In an alternative embodiment, depicted in FIG. 8, clutch 202 and connecting axle 204 are not included along main axle control assembly 190. In this embodiment, drive axle second end 196 has a splined section along which first coupling member 214 is rotationally retained. Compression spring 208 biases first coupling member 214 toward drive axle second end 196 on which a cap 215 is present to prevent detachment of first coupling member 214 from main axle control assembly 190.

Referring to FIGS. 5 and 6, rotary valve axle 220 is slidingly and rotationally retained at a rotary valve axle second end 222 by a fourth bearing 286 and proximate rotary valve axle first end 224 by engagement controller 230. Rotary valve axle 220 is retained by engagement controller 230 intermediate second coupling member 216 and a disengagement plate 218.

Figure 4:
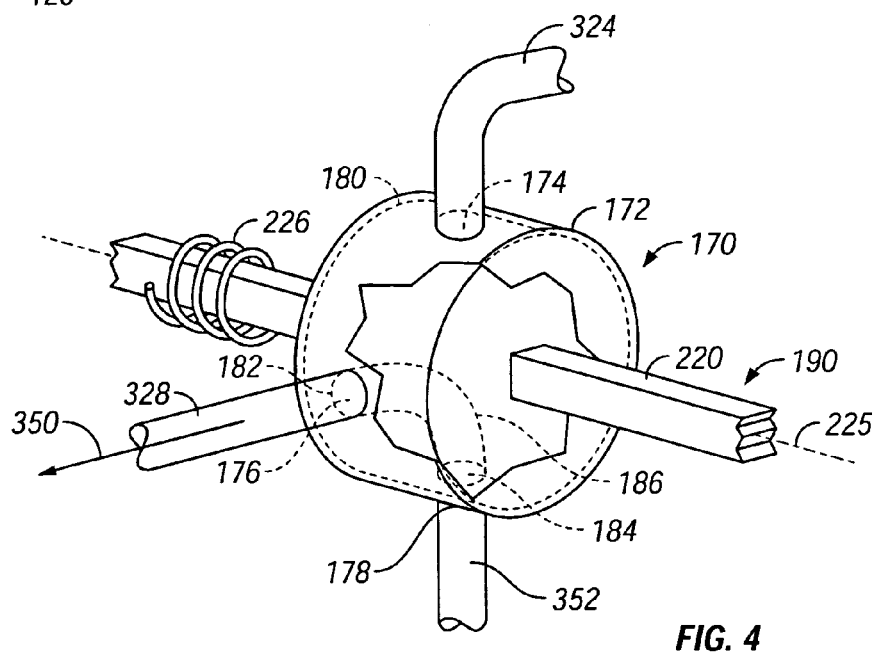
FIG. 4 is a perspective view of the rotary valve.

Rotary valve 170 is located along rotary valve axle 220. Referring to FIG. 4, rotary valve 170 comprises a valve housing 172 and a rotatable fluid communicator 180. Fluid communicator 180 has a communicator inlet 182 and a communicator outlet 184 connected by a valve orifice 186. As rotary valve axle 220 must be linearly movable along rotary valve axis 225 to be coupled to connecting axle 204, valve housing 172 has a fixed location while rotary valve axle 220 may slide therethrough.

Valve housing 172 has three ports 174, 176, 178. First port 174 is in fluid communication with valve actuating line first segment 324. Second port 176 is in fluid communication with valve actuating line second segment 328. Third port 178 is in fluid communication with relief line 352. Second port 176 is located intermediate first port 174 and third port 178 such that in a device initial position, communicator inlet 182 is in communication with second port 176 and communicator outlet 184 is in communication with third port 178. In a device final position (not shown), communicator inlet 182 is rotated to be in communication with first port 174 and communicator outlet 184 is in communication with second port 176. Accordingly, the angle between first port 174 and second port 176 is equal to the angle between second port 176 and third port 178.

Referring to FIGS. 4, 5, and 6 a rotational biasing spring 226 is located on rotary valve axle 220 proximate rotary valve 170. When spring-loaded coupler 206 is disengaged, rotational biasing spring 226 biases rotary valve axle 220 to place rotary valve 170 in an initial position in which fluid communication between valve actuating line second segment 328 and relief line 352 is provided.

Referring again to FIGS. 1A and 1B, actuating stream 320, directed through valve actuating line 324 has a pressure stream 340 distributed to pressure line 341. Actuating stream 320 is directed to rotary valve 170, which initially is biased toward a position preventing further fluid flow of actuating stream 320.

Figure 3:
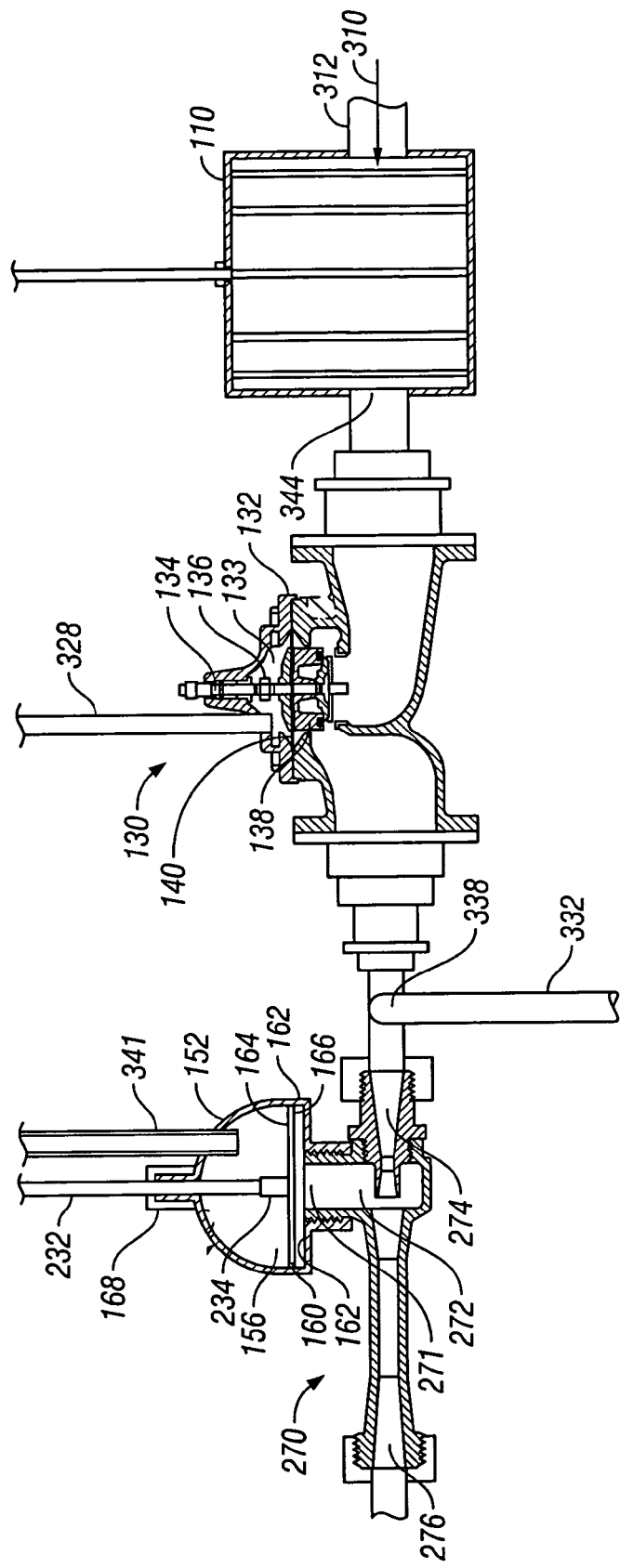
FIG. 3 is a cutaway side view of the rotary meter, diaphragm valve, eductor, and pressure diaphragm.

Diaphragm valve 130 is located downstream of rotary meter 110 on primary line 312. Referring to FIG. 3, primary stream 310 exits rotary meter 110 through an impeller exit orifice 344 and is directed towards diaphragm valve 130. As previously described, diaphragm valve 130 initially is biased to an open position, allowing primary stream 310 to pass therethrough.

Referring again to FIGS. 1A and 1B, after rotary meter 110 has reached the Rotation Limit, main axle control assembly 190 will have been rotated so that rotary valve 170 has been rotated from an initial position to an actuating position. Once rotary valve axle 220 has oriented rotary valve 170 to the actuating position, actuating stream 320 will pass through first port 174 and through fluid communicator 180 to second port 176. Upon exiting second port 176, actuating stream 350 will continue through a valve actuating line second segment 328 to a valve chamber 133 of diaphragm valve 130 (seen in FIG. 3).

Referring to FIG. 3, diaphragm valve 130 is closed when actuating stream 320 is directed through rotary valve 170 to valve actuating line second segment 328. Diaphragm valve 130 may be closable by having a flexible first diaphragm 140 sealed within a diaphragm valve housing 132 to form a valve chamber 133 into which valve actuating line second segment 328 is directed. First diaphragm 140 separates an actuating line side from a primary line side of diaphragm valve 130.

A biasing mechanism 134 biases a valve plug 138 toward an open position so that primary stream 310 may flow through diaphragm valve 130. Pressure applied by actuating stream 320 in valve chamber 133 pushes on first diaphragm 140, which in turn pushes on a valve connecting linkage 136 connected to valve plug 138. Force sufficient to overcome biasing mechanism 134 will be enough to seat valve plug 138 and stop flow of primary stream 310 through diaphragm valve 130. Accordingly, rotary valve 170 serves as an actuating valve for closing diaphragm valve 130.

Closure of valve plug 138 prevents further flow by primary stream 310 through diaphragm valve 130 and consequently through device outlet 104. Simultaneously, flow is stopped through rotary meter 110. Without flow through rotary meter 110, rotation of impeller shaft 114 ceases. Rotation of main axle control assembly 190 also ceases.

Referring to FIGS. 1A, 1B, and 3, an eductor 270 is located immediately downstream of diaphragm valve 130 along primary line 312. Eductor 270 has an eductor inlet 274, an eductor outlet 276 and a suction inlet 271. Primary stream 310 entering eductor inlet 274 and exiting eductor outlet 276 causes a decrease in pressure at suction inlet 271.

Eductor diaphragm 160 is sealed proximate its outer periphery 162 to suction inlet 271, thereby creating a suction chamber 272. A pressure diaphragm housing 152 may be sealed around eductor diaphragm 160 such that a pressure chamber 156 is formed with eductor diaphragm 160, thereby segregating pressure chamber 156 and suction chamber 272. Pressure line 341 may provide fluid communication from valve actuating line first segment 324 to pressure chamber 156.

Eductor diaphragm 160 thus segregates a primary line side from and actuating line side of eductor 270. Eductor diaphragm 160 is responsive to differences between the pressure on second surface 166 and pressure on first surface 164. That is, eductor diaphragm 160 may deform to equalize pressure between first surface 164 and second surface 166, which also changes the volume of pressure chamber 156 and suction chamber 272. Negative pressure created within suction chamber 272 by primary stream 310 and positive pressure created within pressure chamber 156 by pressure stream 340 cause eductor diaphragm 160 to deform into suction chamber 272.

After passing through eductor 270, primary stream 310 exits the consumption limiting flow control apparatus 100 through device outlet 104 so long as diaphragm valve 130 remains open and device outlet 104, or a control point beyond device outlet 104 remains open.

A control line 332 directs a control stream 330 from device inlet 102 to a control line outlet 338. Control line outlet 338 feeds into primary line 312 just upstream of eductor 270. Thus, control stream 330 contributes to the negative pressure created within suction chamber 272 in eductor 270.

Engagement controller 230 interfaces with eductor diaphragm 160 and provides appropriate movement to second coupling member 216. Deformation of eductor diaphragm 160 results in linear displacement of engagement controller 230. A seal 168 prevents leakage of pressure stream 340 from pressure chamber 156. When eductor diaphragm 160 deforms into suction chamber 272, engagement controller 230 pushes second coupling member 216 toward first coupling member 214. When eductor diaphragm 160 reforms to its original position, engagement controller 230 disengages first and second coupling members 214 and 216.

Referring to FIGS. 1A, 1B, and 5, in a first embodiment, engagement controller 230 comprises a first connecting member 232, a first lever 240, a second connecting member 250, and a second lever 260.

First connecting member 232 is affixed at a first connector first end 234 to first surface 164 of eductor diaphragm 160 and extends through pressure diaphragm housing 152 to a first connector second end 236. As eductor diaphragm 160 is deformed due to pressure differences between first surface 164 and second surface 166, first connecting member 232 is linearly displaced along a first connector axis 238.

In the embodiment shown in FIGS. 1A and 1B, first lever 240 is linked to first connector second end 236 at a first lever first end 242. First lever second end 246 is linked to second connecting member 250. First lever first end 242 and first lever second end 246 are pivotally attached to opposing ends of a first lever fulcrum 244. First lever fulcrum 244 is rotationally retained and may be elongated along the first lever axis 248, about which first lever fulcrum 244 may be rotated. Thus, when first connecting member 232 is moved along first connector axis 238, second connecting member 250 is moved along a second connector axis 256, which may be perpendicular to first connector axis 238.

Continuing to refer to FIGS. 1A, 1B, and 5, second connecting member 250 is adjoined to second lever 260 proximate a second connector second end 254. When linearly displaced along second connector axis 256, second connector member 250 transfers the linear displacement to second lever first end 262.

Second lever 260 pivots about a second fulcrum 264 so that movement of second lever first end 262 in one direction results in movement of a second lever second end 266 in an opposite direction. As can be seen on FIGS. 1A, 1B, and 6, second lever second end 266 includes two tines 268 between which a slot 265 is defined. Rotary valve axle 220 is slidingly held within slot 265. As second connector member 250 applies force to second lever 260 toward second connector second end 254, second lever second end 266 applies force to disengagement plate 218, thereby disengaging spring loaded coupler 206. When second connecting member 250 applies force to second lever 260 toward second connector first end 262, second lever second end 266 applies force to move second coupling member 216 towards first coupling member 214.

The use of levers 240 and 260, and connecting members 232 and 250 provides for adjustability within the flow control apparatus 100. Thus, the system may be adjusted for variations such as the flexibility of eductor diaphragm 160 or tolerances of the various components.

It is contemplated that fewer than the four components described, wherein a first connecting member 432 and a first lever 440 may be used to engage and disconnect coupler members 214 and 216. In yet another configuration one connecting member may be used. While the reduction of components has the advantage of simplicity in assembling fluid consumption limiting flow control apparatus 100, the use of fewer components has the disadvantage of reduced adjustability of the system.

Referring to FIGS. 1A, 1B, and 2, in operation, a fluid stream 300, in the form of a liquid or compressed gas enters flow control apparatus 100 through a device inlet 102. Fluid stream 300 entering through device inlet 102 is split into primary stream 310, actuating stream 320, and control stream 330. Actuating stream 320 is directed through valve actuating line first segment 324, control stream 330 is directed through control line 332, and primary stream 310 is directed through a primary line 312. A majority of fluid steam 300 is directed through primary line 312.

Control line 332 is in fluid communication with primary line 312 and includes a control valve 334 and a check valve 336. Control valve 334 provides adjustability of the control stream 330 through control line 332 so that control stream 330 is a nominal flow rate. Check valve 336 ensures that there is no back flow of control stream 330 toward device inlet 102.

Flow control apparatus 100 automatically resets after flow has been shutoff by closing the device outlet 104. Once the device outlet 104 is in a closed position, control stream 330 is stopped at the device outlet 104. The fluid provided by control stream 330 will continue to accumulate within primary line 312 until it eventually backs up into eductor 270 and fills pressure chamber 156. When fluid fills pressure chamber 156, positive pressure is applied to eductor diaphragm 160, thereby reforming it to an original position. Eductor diaphragm 160 in a reformed position linearly replaces engagement controller 230 to the extent that spring-loaded coupler 206 is disengaged. Biasing spring 226 will return rotary valve axle 220 to its initial position where fluid communicator 180 in rotary valve 170 provides fluid communication between second port 176 and third port 178. Fluid communication between valve actuating line second segment 328 and relief line 352 is thus provided by rotary valve 170 and pressure from actuating stream 320 on diaphragm valve 130 is relieved. Biasing mechanism 134 will reopen valve plug 138, permitting primary stream 310 to flow therethrough. The same process will occur again as described until the Volume Limit has been reached again.

The fluid from actuating stream 350 in valve actuating line second segment 328 is directed through a relief line 352 to device outlet 104. A release line check valve 354 in relief line 352 prevents back flow of primary stream 310 into relief line 352 during operation of flow control apparatus 100.

If the flow of primary stream 310 is stopped from a point beyond device outlet 104 before the Volume Limit has been reached, pressure within primary line 312 will build, and suction chamber 272 of eductor 270 will fill. The pressure buildup within primary line 312 and suction chamber 272 will linearly displace engagement controller 230 in the direction opposite of the linear displacement when primary stream 310 is flowing. The linear displacement on engagement controller 230 due to termination of the device outlet will cause engagement controller 230 to disengage spring loaded coupler 206 by applying force to disengagement plate 218.

Upon disengagement of spring loaded coupler 206, rotational biasing spring 226 repositions rotary valve axle 220 to an initial position wherein rotary valve 170 provides fluid communication between valve actuating line second segment 328 and relief line 352. Thus, when flow is stopped before the Volume Limit is reached, flow control apparatus 100 will be reset to start over when primary stream begins to flow again.

The foregoing description of the invention illustrates a preferred embodiment thereof. Various changes may be made in the details of the illustrated construction within the scope of the appended claims without departing from the true spirit of the invention. The present invention should only be limited by the claims and their equivalents.

What is claimed is:

1. A flow control device comprising:
a primary line;
a primary line inlet and a primary line outlet;
an actuating line and a control line, each said actuating line and said control line in fluid communication with said primary line;
a meter for determining flow through said primary line;
an actuating valve;

said actuating valve having an actuating valve inlet in fluid communication with said actuating line;

said actuating valve biased to a first actuating valve position;

a control assembly operably connecting said meter and said actuating valve;

said control assembly operable to move said actuating valve to a second actuating valve position responsive to said meter;

a primary line valve on said primary line;

said actuating valve operable to provide fluid communication to said primary line valve in said second actuating valve position;

said primary line valve operable to a closed position responsive to flow through said actuating valve;

an eductor on said primary line;

said eductor having a primary line eductor inlet, a primary line eductor outlet and a suction chamber;

an eductor diaphragm in said eductor suction chamber;

said eductor diaphragm defining a suction chamber primary line side and a suction chamber actuating line side;

said eductor diaphragm moveable responsive to differential pressure between said suction chamber primary line side and said suction chamber actuating line side;

an engagement controller engaging said eductor diaphragm and said control assembly;

said engagement controller operable to disconnect said control assembly connection between said meter and said actuating valve;

said primary line valve intermediate said eductor and said primary line inlet; and said control line in fluid communication with said eductor inlet intermediate said primary line valve and said eductor inlet.

2. A flow control device according to claim 1 further comprising:
a downstream valve on said primary line downstream of said eductor; and
said downstream valve operable to restrict flow through said primary line.

3. A flow control device according to claim 2 wherein further comprising:
a control line valve provided on said control line intermediate said primary line and said eductor inlet.

4. A flow control device according to claim 1 wherein:
said actuating valve comprises a bi-directional valve;
said primary line valve comprises a diaphragm valve; and
said inlet of said bi-directional valve is in fluid communication with a diaphragm of said primary line valve in said bi-directional valve second position.

5. A flow control device according to claim 4 wherein:
said bi-directional valve comprises a rotary valve; and
said meter comprises a rotary meter.

6. A flow control device according to claim 5 wherein:
said control assembly comprises an axle assembly having a drive axle, an actuating valve axle and a coupling; and
said engagement controller operable to engage said coupling to disconnect said drive axle from said actuating valve axle.

7. A flow control device according to claim 6 wherein:
said engagement controller operable to move said rotary valve axle responsive to movement of said eductor diaphragm.

8. A flow control device according to claim 6 wherein:
a first gear assembly intermediate said drive axle and said rotary meter; and
said first gear assembly operable to provide a first predetermined rotation to said drive axle responsive to defined rotation of said rotary meter.

9. A flow control device according to claim 8 wherein:
said first gear assembly contained in a first gear box;
at least one alternate gear assembly contained in at least one alternate gear box;
said at least one alternate gear assembly operable to provide a second predetermined rotation to said drive axle responsive to predetermined rotation of said rotational meter; and
said at least one alternate gear box capable of installation as an alternate to said first gear box.

10. A flow control device according to claim 9 wherein:
said first gear assembly comprises a spur gear including a plurality of teeth around a gear periphery;
said spur gear affixed to said drive axle;
a worm gear on said rotational meter; and
said worm gear including at least one gear thread operatively engaging said spur gear plurality of teeth.

11. A flow control device according to claim 6 wherein:
a reset spring is provided on said actuating valve axle; and
said reset spring is operable to bias said rotary valve to said first actuating valve position.

12. A flow control device according to claim 5 wherein:
said engagement controller having an eductor end contacting said eductor diaphragm;
said engagement controller having a lever end pivotally attached to a lever assembly; and
said lever assembly operable to disconnect said actuating valve axle from said drive axle.

13. A flow control device according to claim 12 wherein:
said lever assembly comprising a first lever and a second lever;
said first lever pivotally connected to said engagement controller;
said second lever pivotally connected to said bi-directional valve axle; and
said lever assembly operable to disengage said spring-loaded coupling responsive to linear displacement of said engagement controller.

14. A flow control device according to claim 7 wherein:
said drive axle includes a gear end and a coupling end;
said coupling end includes a plurality of splines;
a cap affixed to said coupling end;
said spring-loaded coupling includes a first coupling member slidingly retained along said plurality of splines and a second coupling member on said actuating valve axle; and
a coupling spring biasing said first coupling member toward said cap.

15. A flow control device according to claim 14 wherein:
said drive axle includes a clutch;
said clutch intermediate said gear assembly and said coupling end.

16. A flow control device comprising:
a primary line;
a primary line inlet and a primary line outlet;
a diaphragm valve controlling flow through said primary line;
an actuating line and a control line, each said actuating line and said control line in fluid communication with said primary line;
a rotational meter for measuring flow through said primary line;
an actuating valve in fluid communication with said actuating line;

said actuating valve biased by a reset spring to prevent flow to said diaphragm valve;

a control system intermediate said meter and said actuating valve;

said control system operable to move said actuating valve to allow flow to said diaphragm valve responsive to rotation of said meter;

said diaphragm valve having a diaphragm defining a diaphragm valve actuating line side and a diaphragm valve primary line side;

said diaphragm valve operable to a closed position responsive to flow from said actuating valve to said diaphragm valve actuating line side;

an eductor on said primary line;

said eductor having a primary line eductor inlet, a primary line eductor outlet and a suction chamber;

an eductor diaphragm in said eductor suction chamber;

said eductor diaphragm moveable responsive to differential pressure between a primary line side of said eductor diaphragm and an actuating line side of said eductor diaphragm;

said actuating line side of said eductor diaphragm in fluid communication with said actuating line;

said control system including a main axle assembly;

said main axle assembly comprising a drive axle and an actuating valve axle;

said drive axle operably connected to said metering device;

said actuating valve axle operably connected to said actuating valve;

an engagement controller engaging said eductor diaphragm and said main axle assembly;

said drive axle operably connected to said actuating valve axle in an engagement controller first position;

said engagement controller disengaging said drive axle from said actuating valve axle in an engagement controller second position;

said control line in fluid communication with said eductor primary line inlet intermediate said diaphragm valve and said eductor primary line inlet;

said diaphragm valve intermediate said eductor and said primary line inlet; and said control line operable to provide flow to said eductor inlet when said diaphragm valve is in a closed position.

17. A flow control device according to claim 16 wherein:

said main axle assembly is operable responsive to rotation of said rotary meter to induce rotation of said rotary valve toward said second valve position.

18. A flow control device according to claim 16 wherein:

said actuating line provides fluid communication from said primary line through said rotary valve to said diaphragm valve actuating line side when said actuating valve is in said actuating valve second position; and whereby said diaphragm of said diaphragm valve is operable to close said primary line valve responsive to fluid pressure from said actuating line.

19. A flow control device according to claim 16 wherein:

said control line provides fluid communication from said primary line to said eductor primary line side; and whereby said eductor diaphragm is operable to cause linear displacement of said engagement controller to an engagement controller second position thereby disengaging said drive axle from said actuating valve axle responsive to flow through said control line to said eductor.

20. A flow control device according to claim 16 wherein:

said actuating valve reset spring biases said actuating valve away from said actuating valve second position upon disengagement of said drive axle from said actuating valve axle; and whereby said diaphragm of said primary line valve is operable to open said primary line valve responsive upon cessation of fluid communication from said primary line to the actuating line side of said diaphragm valve.

21. A flow control device according to claim 16 wherein:

said eductor diaphragm is operable to cause linear displacement of said engagement controller to an engagement controller first position responsive to suction induced by flow through said primary line and said eductor; and thereby allowing engagement of said drive axle with said actuating valve axle.

* * * * *